US011015347B2

(12) United States Patent
Summer

(10) Patent No.: US 11,015,347 B2
(45) Date of Patent: May 25, 2021

(54) ARBITRARILY CURVED SUPPORT STRUCTURE

(71) Applicant: MARTE AND MARTE LIMITED, Lochau (AT)

(72) Inventor: Marcel Summer, Dornbirn (AT)

(73) Assignee: MARTE AND MARTE LIMITED, Lochau (AT)

( * ) Notice: Subject to any disclaimer, the term of this patent is extended or adjusted under 35 U.S.C. 154(b) by 0 days.

(21) Appl. No.: 16/576,150

(22) Filed: Sep. 19, 2019

(65) Prior Publication Data

US 2020/0040578 A1    Feb. 6, 2020

Related U.S. Application Data

(63) Continuation of application No. PCT/EP2018/055780, filed on Mar. 8, 2018.

(30) Foreign Application Priority Data

Mar. 22, 2017  (EP) ..................................... 17162323

(51) Int. Cl.
*E04C 3/09* (2006.01)
*B23P 13/04* (2006.01)
(Continued)

(52) U.S. Cl.
CPC ................ *E04C 3/09* (2013.01); *B23P 13/04* (2013.01); *B23P 15/00* (2013.01);
(Continued)

(58) Field of Classification Search
CPC ............... E04C 3/09; E04C 2003/0413; E04C 2003/043; E04C 2003/0439;
(Continued)

(56) References Cited

U.S. PATENT DOCUMENTS

| 6,094,877 | A | 8/2000 | White | |
| 6,237,301 | B1 * | 5/2001 | Paradis | .................. E04C 3/005 52/247 |

(Continued)

FOREIGN PATENT DOCUMENTS

| CA | 2772925 A1 * | 4/2011 | ............... E04C 3/07 |
| CN | 101078238 | 11/2007 | |

(Continued)

OTHER PUBLICATIONS

International Search Report issued Apr. 19, 2018 in International (PCT) Application No. PCT/EP2018/055780.

*Primary Examiner* — Babajide A Demuren
(74) *Attorney, Agent, or Firm* — Wenderoth, Lind & Ponack, L.L.P.

(57) ABSTRACT

A method for producing a support structure having a three-dimensional geometry curved in any manner, includes making at least one first and one second flat material piece. The geometry has curves in three directions that are orthogonal to one another, and the method includes the following steps: A. preparing the desired geometry, B. approximating the desired geometry, C. subdividing the geometry, D. defining at least one clearance region, E. defining a plurality of connection points arranged on the at least one first and one second part, F. defining chamfered edges extending between the polygonal cross-sections, G. developing the at least one first and one second part, H. cutting to length at least one first and one second flat material piece, I. chamfering, and J. connecting the at least one chamfered first material piece and the at least one chamfered second material piece.

8 Claims, 22 Drawing Sheets

(51) Int. Cl.
*B23P 15/00* (2006.01)
*E04C 3/04* (2006.01)

(52) U.S. Cl.
CPC .................. *E04C 2003/043* (2013.01); *E04C 2003/0413* (2013.01); *E04C 2003/0439* (2013.01); *E04C 2003/0465* (2013.01); *E04C 2003/0469* (2013.01)

(58) Field of Classification Search
CPC ...... E04C 2003/0473; E04C 3/07; E04C 3/40; E04C 3/005; B23P 13/04; B23P 15/00; E04B 2/967
See application file for complete search history.

(56) References Cited

U.S. PATENT DOCUMENTS

| | | | |
|---|---|---|---|
| 6,434,908 B1 * | 8/2002 | Ferrante | E04B 9/061 52/481.2 |
| 6,481,259 B1 | 11/2002 | Durney | |
| 6,637,173 B1 | 10/2003 | Wheeler | |
| 6,877,349 B2 | 4/2005 | Durney et al. | |
| 7,032,426 B2 | 4/2006 | Durney et al. | |
| 7,152,449 B2 | 12/2006 | Durney et al. | |
| 7,152,450 B2 | 12/2006 | Durney et al. | |
| 7,222,511 B2 | 5/2007 | Durney et al. | |
| 7,263,869 B2 | 9/2007 | Durney et al. | |
| 7,350,390 B2 | 4/2008 | Durney et al. | |
| 7,374,810 B2 | 5/2008 | Durney et al. | |
| 7,412,865 B2 | 8/2008 | Durney | |
| 7,440,874 B2 | 10/2008 | Durney et al. | |
| 7,464,574 B2 | 12/2008 | Durney et al. | |
| 7,534,501 B2 | 5/2009 | Durney | |
| 7,560,155 B2 | 7/2009 | Durney et al. | |
| 7,640,775 B2 | 1/2010 | Durney | |
| 7,643,967 B2 | 1/2010 | Durney et al. | |
| 8,114,524 B2 | 2/2012 | Durney | |
| 8,377,566 B2 | 2/2013 | Durney et al. | |
| 8,505,258 B2 | 8/2013 | Durney | |
| 8,507,827 B2 | 8/2013 | Eftymiades | |
| 8,983,801 B2 | 3/2015 | Schneider et al. | |
| 9,538,404 B2 | 1/2017 | Seckendorf et al. | |
| 2003/0037586 A1 | 2/2003 | Durney et al. | |
| 2004/0069755 A1 | 4/2004 | Eftymiades | |
| 2004/0134250 A1 | 7/2004 | Durney et al. | |
| 2004/0206152 A1 | 10/2004 | Durney et al. | |
| 2005/0005670 A1 | 1/2005 | Durney et al. | |
| 2005/0061049 A1 | 3/2005 | Durney et al. | |
| 2005/0064138 A1 | 3/2005 | Durney et al. | |
| 2005/0086902 A1 * | 4/2005 | Mears | E04B 2/7457 52/749.1 |
| 2005/0097937 A1 | 5/2005 | Durney et al. | |
| 2005/0115192 A1 * | 6/2005 | Stone | E04C 3/07 52/85 |
| 2005/0126110 A1 | 6/2005 | Durney et al. | |
| 2005/0257589 A1 | 11/2005 | Durney et al. | |
| 2006/0021413 A1 | 2/2006 | Durney et al. | |
| 2006/0075798 A1 | 4/2006 | Durney et al. | |
| 2006/0207212 A1 | 9/2006 | Durney | |
| 2006/0213245 A1 | 9/2006 | Durney | |
| 2006/0261139 A1 | 11/2006 | Durney | |
| 2006/0277965 A1 | 12/2006 | Durney | |
| 2007/0113614 A1 | 5/2007 | Durney et al. | |
| 2008/0016937 A1 | 1/2008 | Durney et al. | |
| 2008/0063834 A1 | 3/2008 | Durney et al. | |
| 2008/0121009 A1 | 5/2008 | Durney et al. | |
| 2008/0187427 A1 | 8/2008 | Durney | |
| 2008/0193714 A1 | 8/2008 | Durney et al. | |
| 2008/0271511 A1 | 11/2008 | Durney et al. | |
| 2009/0043543 A1 | 2/2009 | Durney et al. | |
| 2009/0077923 A1 * | 3/2009 | Mears | E04C 3/09 52/708 |
| 2009/0297740 A1 | 12/2009 | Durney | |
| 2010/0147130 A1 | 6/2010 | Durney et al. | |
| 2010/0271405 A1 | 10/2010 | Schneider et al. | |
| 2011/0031244 A1 | 2/2011 | Durney | |
| 2011/0059330 A1 | 3/2011 | Durney et al. | |
| 2011/0281065 A1 | 11/2011 | Durney | |
| 2011/0287228 A1 | 11/2011 | Durney et al. | |
| 2012/0035904 A1 | 2/2012 | Seckendorf et al. | |
| 2012/0121862 A1 | 5/2012 | Durney et al. | |
| 2012/0276330 A1 | 11/2012 | Durney et al. | |
| 2015/0289682 A1 * | 10/2015 | Evitt | A47B 96/14 211/183 |

FOREIGN PATENT DOCUMENTS

| | | | | |
|---|---|---|---|---|
| CN | 201512901 | 6/2010 | | |
| CN | 102191815 | 9/2011 | | |
| DE | 1 271 350 | 6/1968 | | |
| EP | 2942446 A1 * | 11/2015 | | E04C 3/005 |
| EP | 1715115 B1 * | 6/2018 | | E04C 3/005 |
| JP | 2000-36060 | 2/2000 | | |
| JP | 2003-301549 | 10/2003 | | |
| JP | 2009-202233 | 9/2009 | | |
| WO | 02/18723 | 3/2002 | | |

* cited by examiner

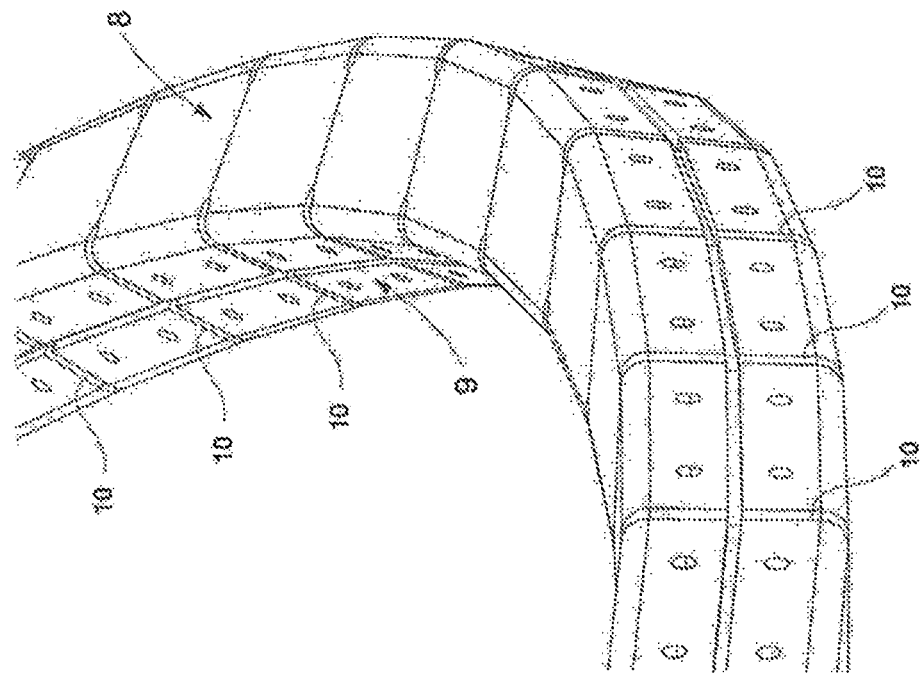
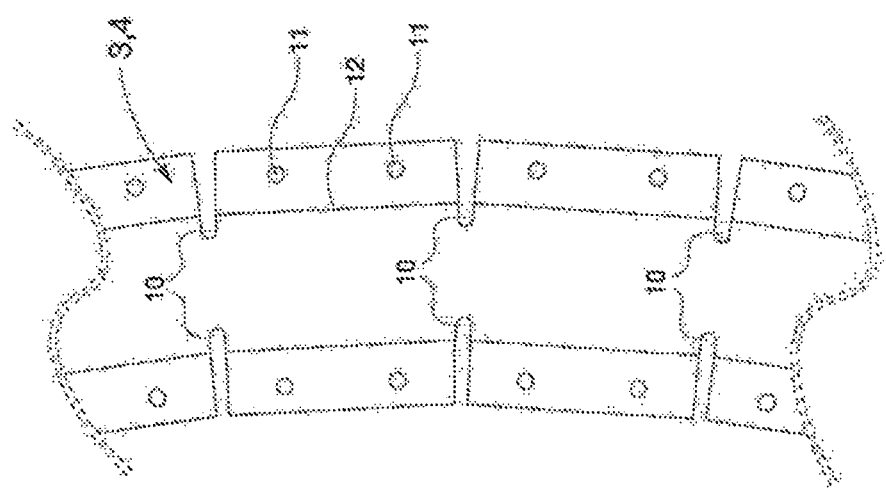
FIG. 10

ARBITRARILY CURVED SUPPORT STRUCTURE

BACKGROUND OF THE INVENTION

The invention concerns a method of producing a carrier structure which extends in a three-dimensional geometry of any desired curvature, and which comprises at least one first and one second flat piece of material. The geometry has curvatures in three mutually orthogonal directions, a carrier structure, a computer program product, and a production plant.

Carrier structures produced in accordance with the above-described method and generic carrier structures in general, for example, can be fitted to facades of building structures and carry facade elements. This involves geometries with a preferably polygonal cross section which—depending on the respective architectural specification—must be capable of (in general of constant cross section) bending with free shaping through space. In this, especially the required twisting of the geometry about its own axis is difficult to resolve construction-wise.

SUMMARY OF THE INVENTION

The object of the invention is to provide a method in which it is possible to produce in a simple fashion carrier structures extending in a three-dimensional geometry of any desired curvature, a carrier structure which extends in a three-dimensional geometry of any desired curvature, a computer program product, and a production plant.

The invention permits the production of dimensionally accurate carrier structures in a three-dimensional geometry of any desired curvature. The geometry can be, for example, a free-form geometry or a beam geometry. A geometry which is section-wise in the form of a free-form geometry and section-wise in the form of a beam geometry is also conceivable. Connecting the at least one beveled first piece of material and the at least one beveled second piece of material along the junctions results in the desired geometry automatically and in a simple and fault-free fashion. It is possible to build carrier structures of any length. The carrier structures can be covered or planked or can carry facade elements in another fashion.

The alphabetic enumeration of steps of the method according to the invention as described below is not to be interpreted as a compulsory order in which the steps have to be carried out (although the specified order is, of course, possible). For example, steps B and C or D, E and F could also be carried out in any changed order.

BRIEF DESCRIPTION OF THE DRAWINGS

The invention is described with reference to drawings in which:

FIG. 10 shows a clearance area of adjoining loft surfaces in the region of a piece of material which is still flat and said clearance area in a rotated and twisted state of the piece of material which is then beveled and connected to a second piece of material, FIGS. 11a and b show an arrangement of carrier structures according to the invention in a perspective view.

DETAILED DESCRIPTION OF THE INVENTION

In order to ensure clarity of the display, not all reference numbers which occur per se are shown in all Figures.

Hereinafter, by way of example, a method according to the invention of producing a carrier structure 1 which extends in a three-dimensional geometry 2 of any desired curvature and which comprises at least one first and one second flat piece of material 3, 4 is described, wherein the geometry 2 has curvatures in three mutually orthogonal directions.

Figure 1:
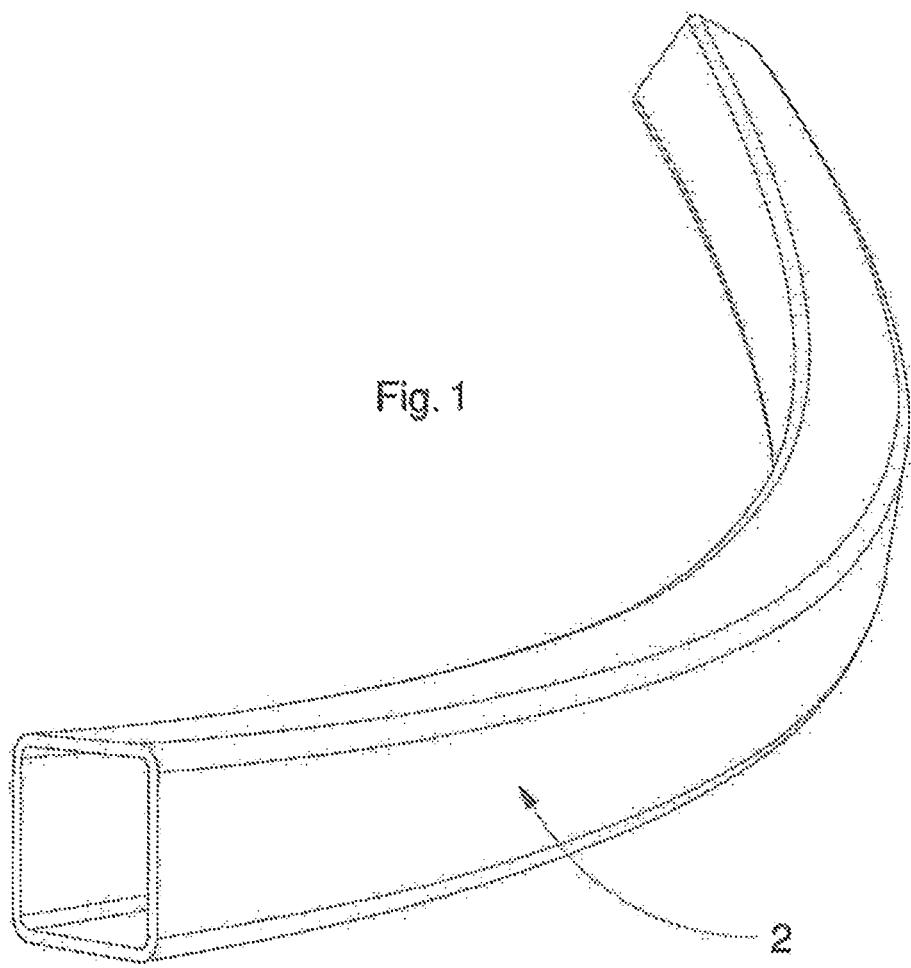
FIG. 1 shows a depiction of an exemplary geometry

A first step A (FIG. 1) involves providing the desired geometry 2 in digital form. The providing of the geometry can be done in many ways known to the expert, for example in the form of CAD data, in the form of Voxel data and so forth.

Figure 2:
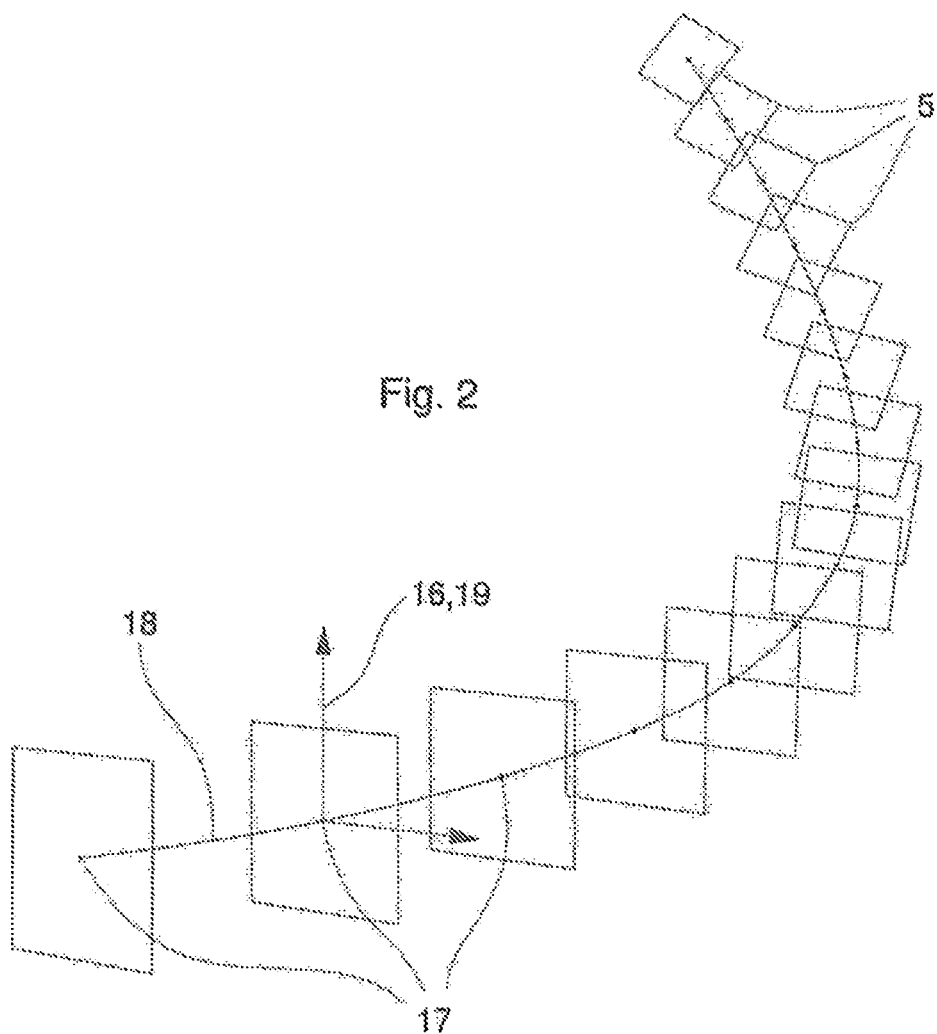
FIG. 2 shows an approximation of the geometry of FIG. 1 by a plurality of polygonal cross sections.
Figure 3:
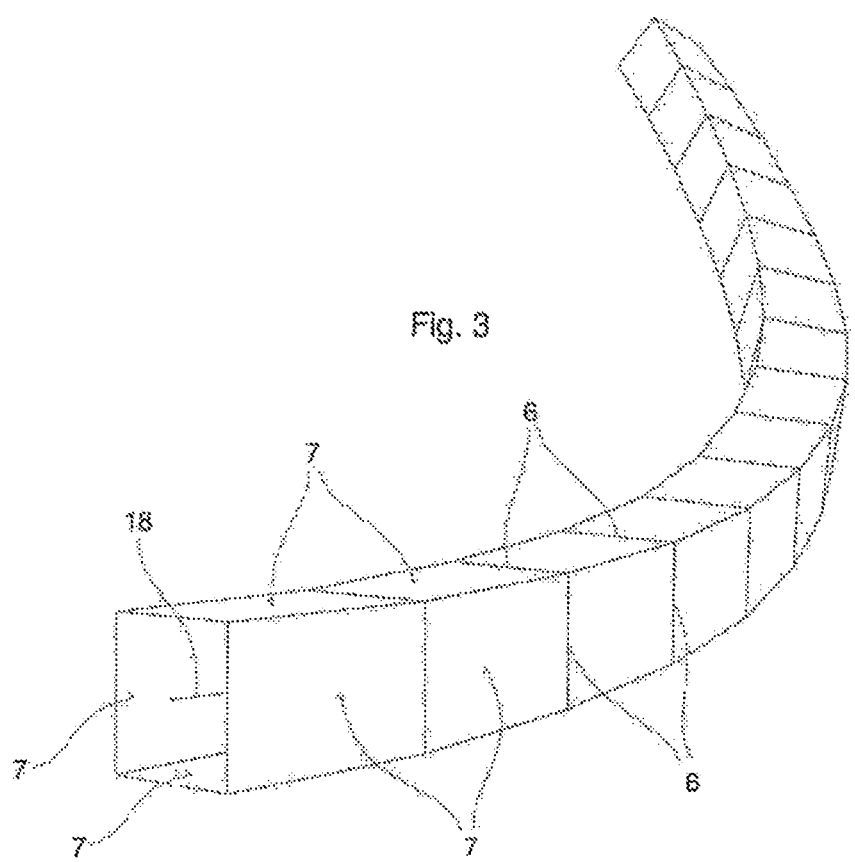
FIG. 3 shows a connection of the side lines of successive polygonal cross sections by loft surfaces.

A second step B involves approximating the desired geometry 2 by ascertaining a plurality of polygonal cross sections 5 along a directrix 18 of the geometry 2 (FIG. 2) and by connecting the side lines 6 of successive polygonal cross sections 5 through loft surfaces 7 (FIG. 3). Approximating the desired geometry 2 and connecting the side lines 6 of successive polygonal cross-sections 5 through loft surfaces 7 can be done manually or automated by means of standard tool commands of a CAD program. The polygonal cross sections 5 used—as illustrated—can be quadrangles, but also triangles, hexagons and so forth.

Figure 4:
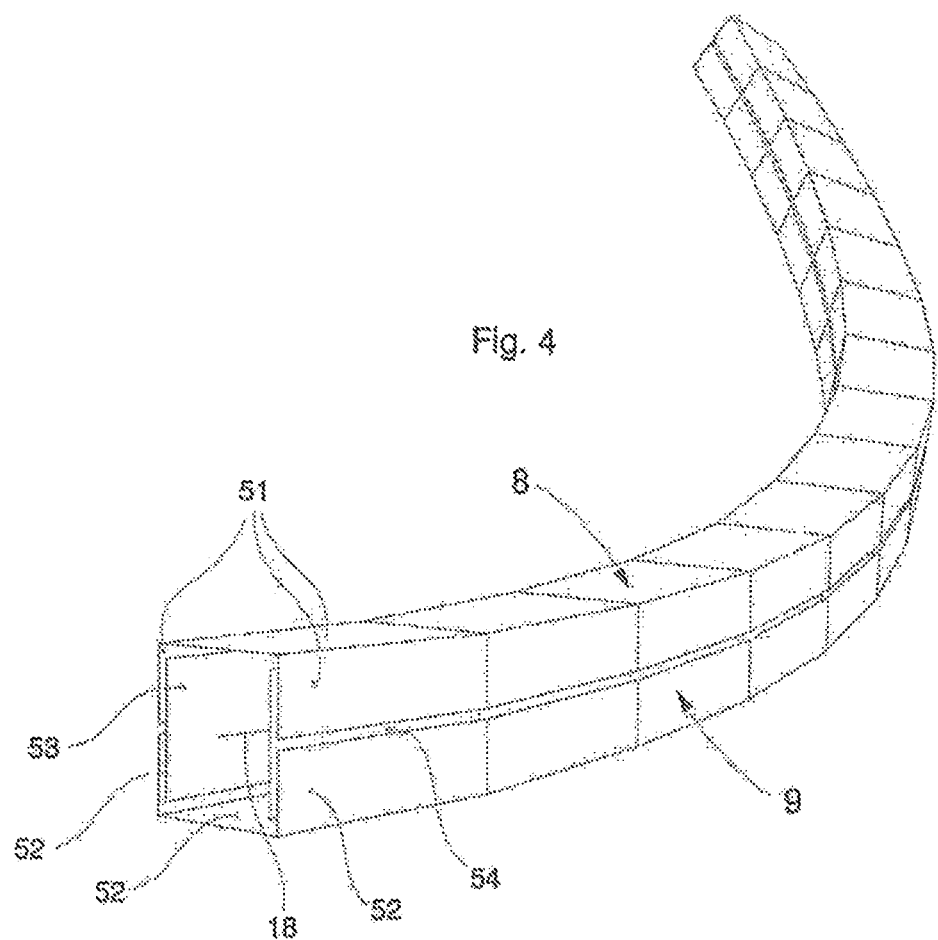
FIG. 4 shows a division of the geometry into a first and a second part.

A further step C (FIG. 4) involves dividing the geometry 2 into at least one first and one second part 8, 9 which run along at least one part of the extent of the geometry 2. In relation to the polygonal cross sections 5, the division is implemented in such way that the individual side lines 6 of the polygonal cross section 5 are divided by computation, more specifically in such way as to cause a projection or an overlap between adjoining side lines 6 so that later this projection or overlap permits the cut pieces of material to be connected. In the case of the quadrangular polygonal cross-section 5 illustrated, this results in the individual surfaces 51 through 54 as shown. The first part 8 which is the upper part in FIG. 4 is formed by the individual surface 51. The second part 9 which is the lower part in FIG. 4 is formed by the individual surface 52. The individual surfaces 53, 54 which extend laterally in FIG. 4 later serve as connection of the first and second part 8, 9. Alternatively, it would also be possible, of course, to consider the individual surfaces 53, 54 as the first or, respectively, second part 8, 9, then the individual surfaces 51 and 52 serve as the connection. Furthermore, another alternative could be to omit the individual surfaces 52 and 54 or 51 and 53, and the later connection of the first and second part 8, 9 can be effected by a displaced arrangement of those parts 8, 9 and by direct fixing to one another or by providing separate individual connecting pieces.

In the depicted preferred illustrative embodiment of a method according to the invention, dividing the geometry 2 into the at least one first and at least one second part 8, 9 is effected in the form of shells which run along the extent of the geometry 2 and which are connected by longitudinal strips.

Figure 5:
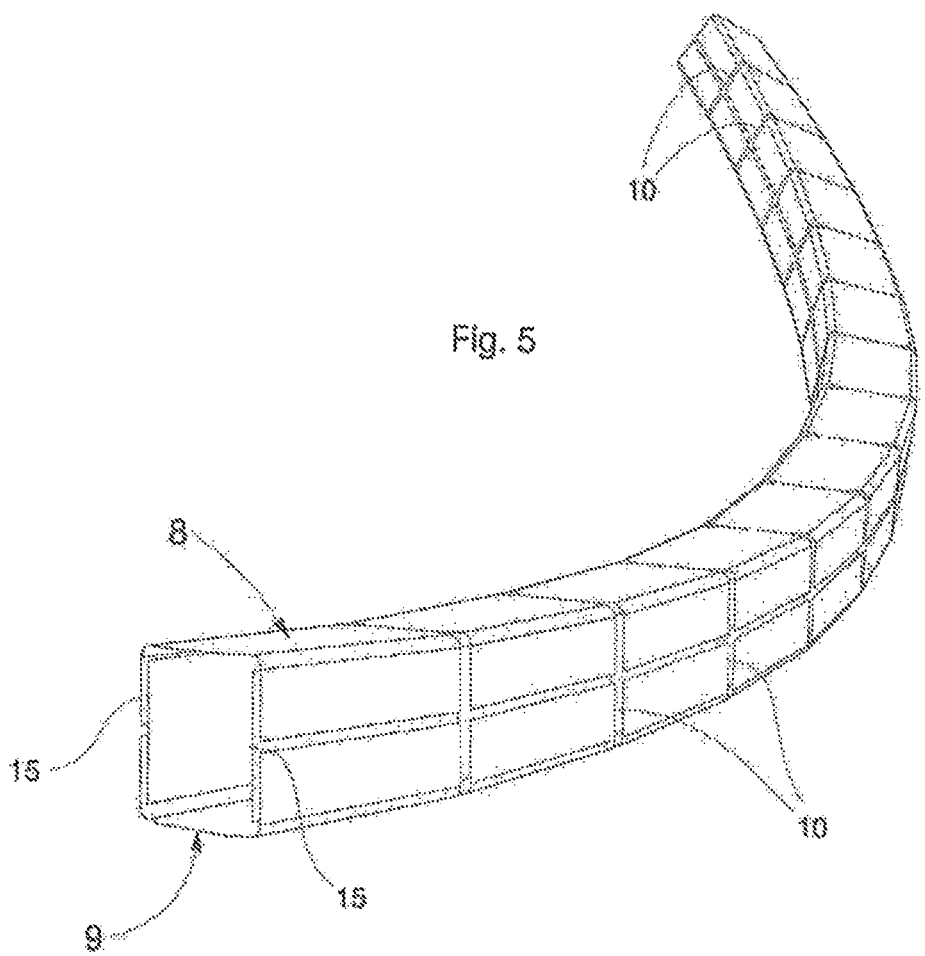
FIG. 5 shows a specification of clearance areas of adjoining loft surfaces in the area of each polygonal cross section.

A further step D (FIG. 5) involves determining at least one clearance area 10 of adjoining loft surfaces 7 in the region of each polygonal cross section 5 (in FIG. 5 the clearance areas 10, for example, extend approximately vertically in the front part). Essentially, the clearance areas 10 perform two functions. On the one hand, they permit beveling of the previously flat first and second pieces of material 3, 4. On the other hand, they permit twisting of the later beveled first and second pieces of material 13, 14. The clearance areas 10 run over a corner region of the polygonal cross sections 5. The width of the clearance areas 10 can vary. The greater the local curvature, the wider the local clearance area 10 should be. The individual segments of the first and second part 8, 9 remain connected in the upper and lower parts of FIG. 5. However, this is not absolutely necessary.

Figure 6:
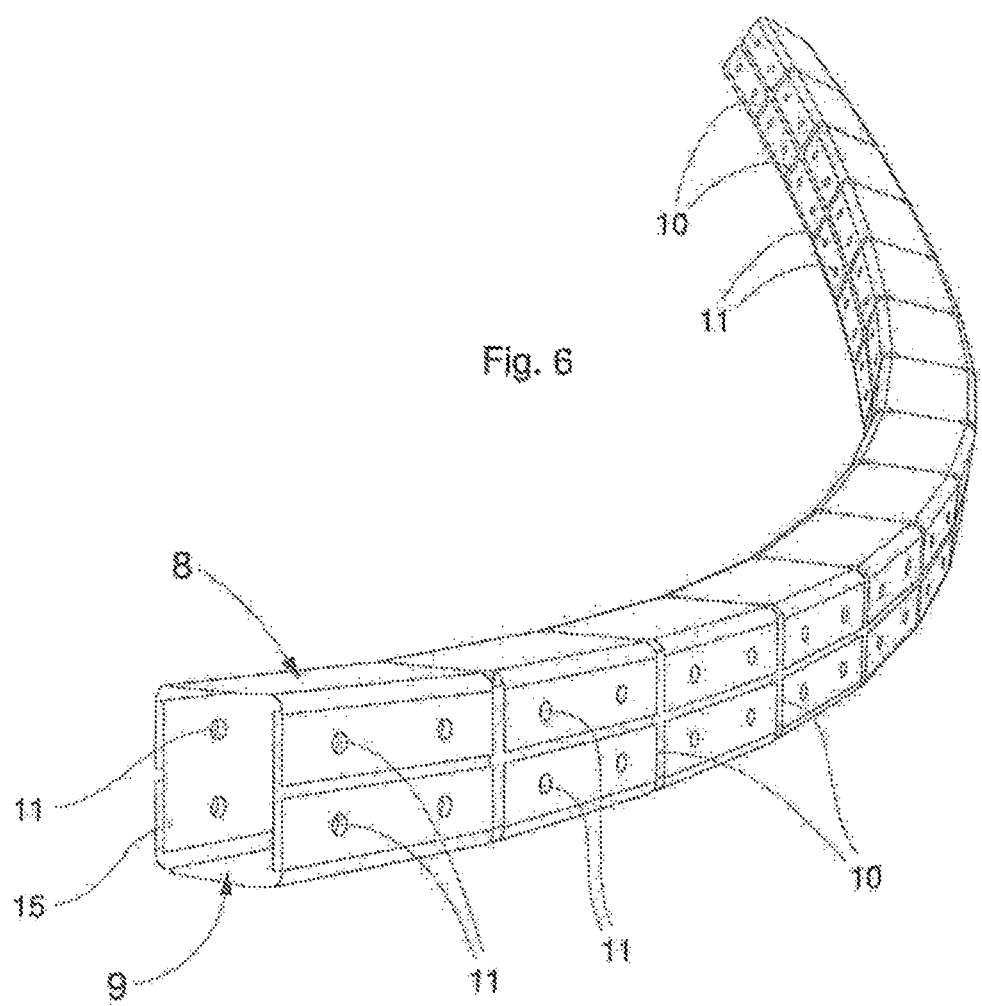
FIG. 6 shows a specification of a plurality of junctions arranged at the first and second part.

A further step E (FIG. 6) involves specifying a plurality of junctions 11 arranged at the first and second parts 8, 9 along the extent of the first and one second part 8, 9 in order to later connect the at least one first and one second part 8, 9. In the example illustrated, the junctions 11 are in the form of holes in order to later insert rivets, bolts, screws or the like. Alternatively, the junctions 11 could also be weld points or adhesive points or weld seams or adhesive seams (line-shaped junctions 11).

Figure 7:
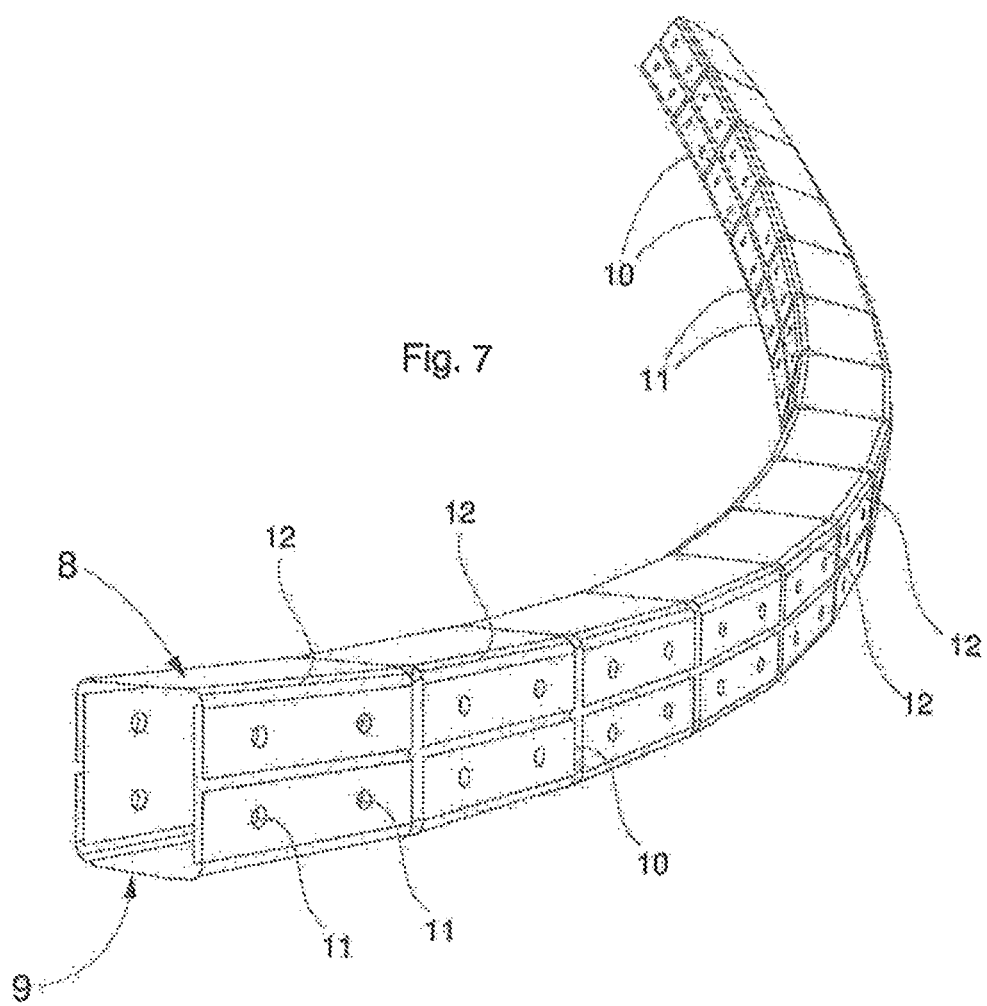
FIG. 7 shows a specification of bevel edges extending between the polygonal cross sections.

A further step F (FIG. 7) involves specifying bevel edges 12 extending between the polygonal cross sections 5. That can be done by standard tool commands of a CAD program given manually or automated.

A further step G involves unwinding the at least one first and one second part 8, 9 which are provided with the clearance areas 10 and junctions 11 and producing a cut contour for the at least one first and one second part 8, 9. One of the curvatures located in three mutually orthogonal directions is represented in the cut contours. That can be done by standard tool commands of a CAD program given manually or automated.

The method steps described above can be carried out purely electronically and represent the planning part of the method according to the invention. Those method steps can be encoded in a computer program product according to the invention. The cut contours as a result of the previous method steps A to G are to be provided in electronic form or in some other suitable fashion for the procedure of cutting. Steps H to J represent the production or manufacturing part of the method according to the invention and can be carried out with a production plant according to the invention.

Figure 8:
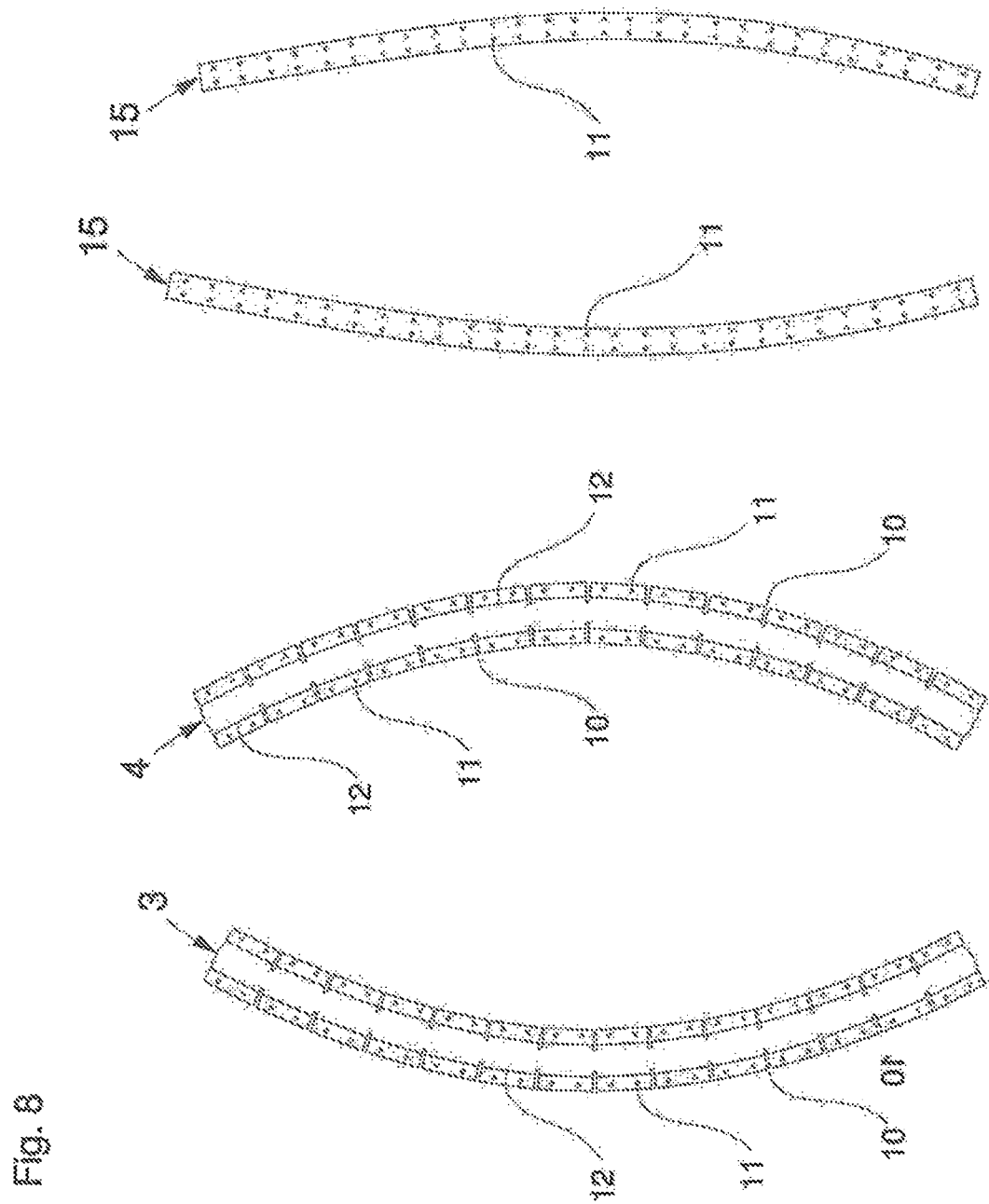
FIG. 8 shows the first and second flat piece of material and the connecting pieces in the cut state.
Figure 9:
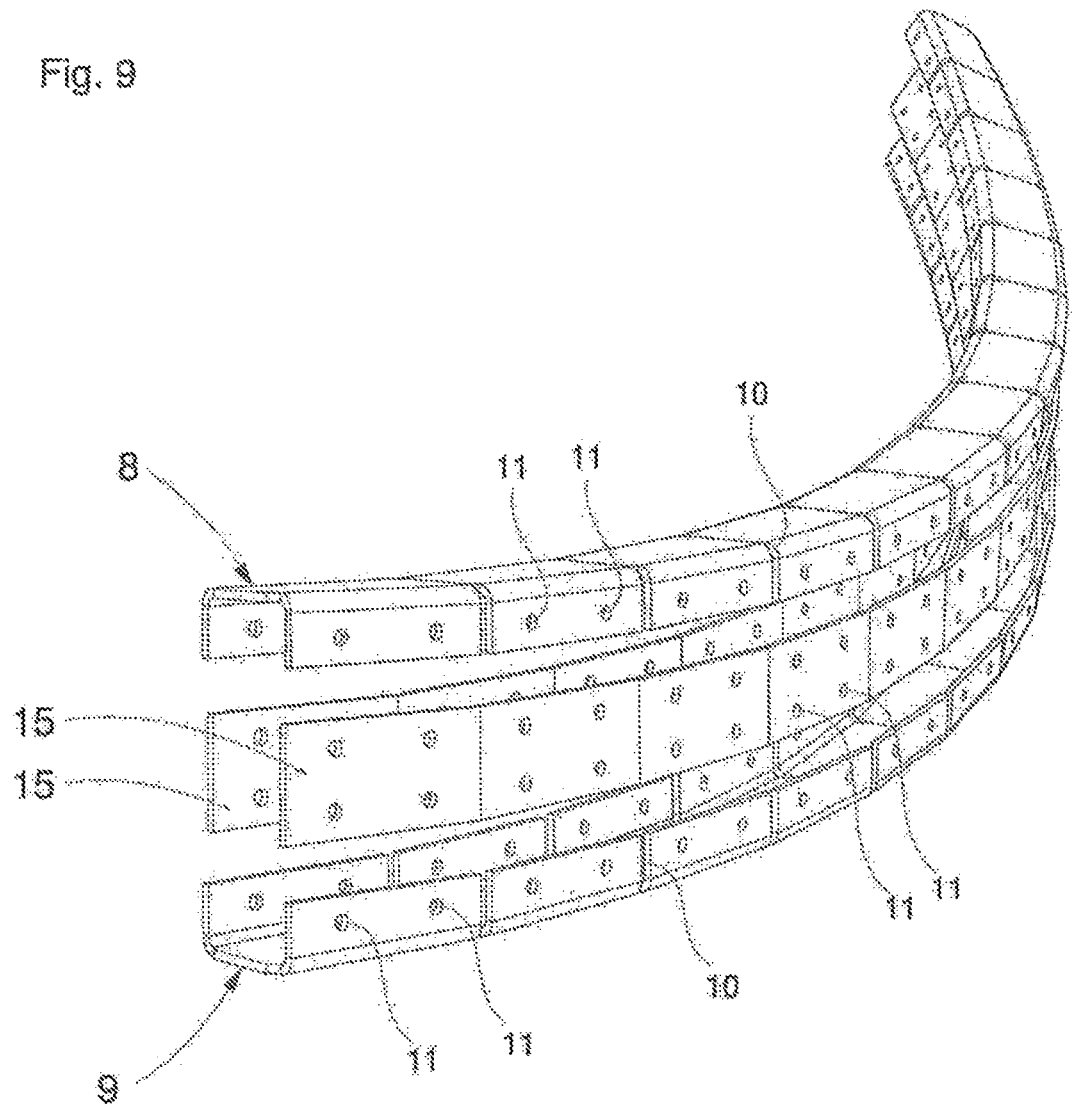
FIG. 9 shows a beveled first piece of material, a beveled second piece of material portion and the connecting pieces.

Step H involves cutting at least one first and one second flat piece of material 3, 4 in accordance with the cut contours in relation to the at least one first and one second part 8, 9. The cutting procedure can be carried out manually or on automated cutting machines and results in the cut first and second flat pieces of material 3, 4 shown in FIG. 8 and flat connecting pieces 15. It is to be noted that in the present disclosure, the term "cutting" is used synonymously for "slicing", "punching", "shearing", "lasering" and so forth.

A further step I involves beveling the cut first and second flat pieces of material 3, 4 along the bevel edges 12 to achieve a beveled first piece of material 13 and a beveled second piece of material 14. Of course, the flat connecting pieces 15 do not have to be beveled and remain flat in the illustrated example.

A further step J (see FIG. 22) involves connecting the beveled first piece of material 13 and the beveled second piece of material 14 along the junctions 11. A rotating and/or twisting of mutually adjoining regions of the beveled first piece of material 13 and the beveled second piece of material 14 permitted by the clearance areas 10 is effected to represent the remaining two curvatures located in three mutually orthogonal directions. The rotated and/or twisted beveled first and beveled second pieces of material portion 13, 14 are fixed by the connecting procedure, and the connection is preferably made manually.

In the depicted illustrative embodiment of a method according to the invention, the polygonal cross sections 5 are formed with polygons of even-numbered order (order equals four) and at least two clearance areas 10 at opposite side lines 6 of the polygonal cross sections 5 are selected. As shown hereinafter, it is, however, also possible to use polygons with an odd-numbered order (for example, order equals three). In general, it is preferable to use one part 53, 54 of the individual surfaces 51, 52, 53, 54 as connecting parts for the remaining individual surfaces 51, 52 in case of polygons with an even-numbered order, and to directly connect (where applicable by way of extension) the individual surfaces 51, 52, 53 in the case of polygons with an odd-numbered order.

In the depicted preferred illustrative embodiment of a method according to the invention, connecting the beveled first piece of material 13 and the beveled second piece of material 14 by the junctions 11 is effected by at least one connecting piece 15 running through at least one part of the extent of the geometry 2. This is, however, not absolutely necessary—as described above.

In the depicted preferred illustrative embodiment of a method according to the invention, the connection is made at the plurality of junctions 11 in the form of rivet connections and/or screw connections and/or weld connections and/or adhesive connections.

In the depicted preferred illustrative embodiment of a method according to the invention, the polygonal cross sections 5 are determined in such way that a surface normal 16 of each polygonal cross section 5 runs parallel to the tangent 19 of the directrix 18, that is located at a piercing point 17 of the polygonal cross section and the directrix 18.

Figure 11B:
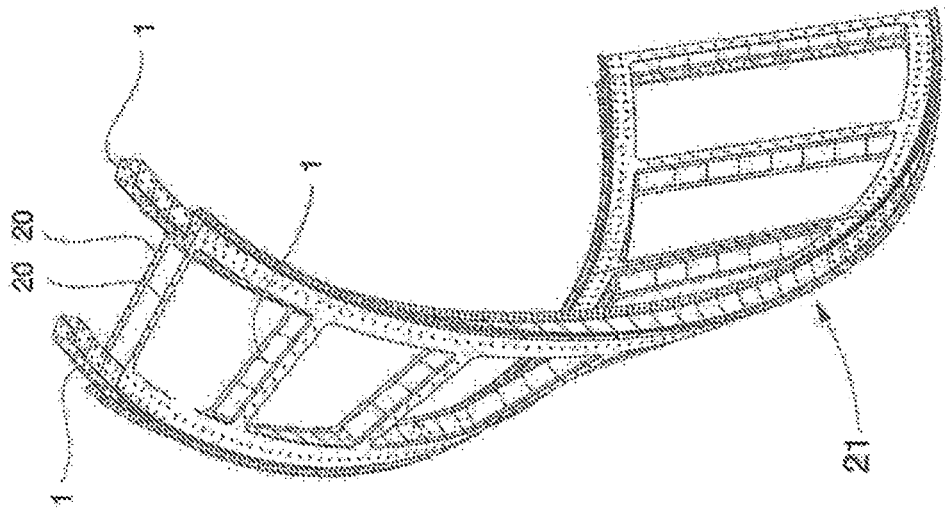

The method described results in a carrier structure 1 according to the invention which extends in a three-dimensional curved geometry 2 and which—in the illustrative embodiment shown—comprises one first and one second beveled piece of material 13, 14, and the geometry 2 has curvatures in three mutually orthogonal directions (see FIG. 11).

The beveled first piece of material 13 and the beveled second piece of material 14 have clearance areas 10 produced by cuts along cut contours. One of the curvatures located in three mutually orthogonal directions is represented in the cut contours (that is to say already in the flat state of the pieces of material 13, 14).

The beveled first piece of material 13 and the beveled second piece of material 14 are connected along a plurality of junctions 11, and a rotating and/or twisting process of mutually adjoining regions of the beveled first piece of material 13 and the beveled second piece of material 14, permitted by the clearance areas 10, form the remaining two of the curvatures located in three mutually orthogonal directions.

The rotated and/or twisted beveled pieces of material 13, 14 are fixed in their rotated and/or twisted form by the connecting procedure.

Figure 11A:
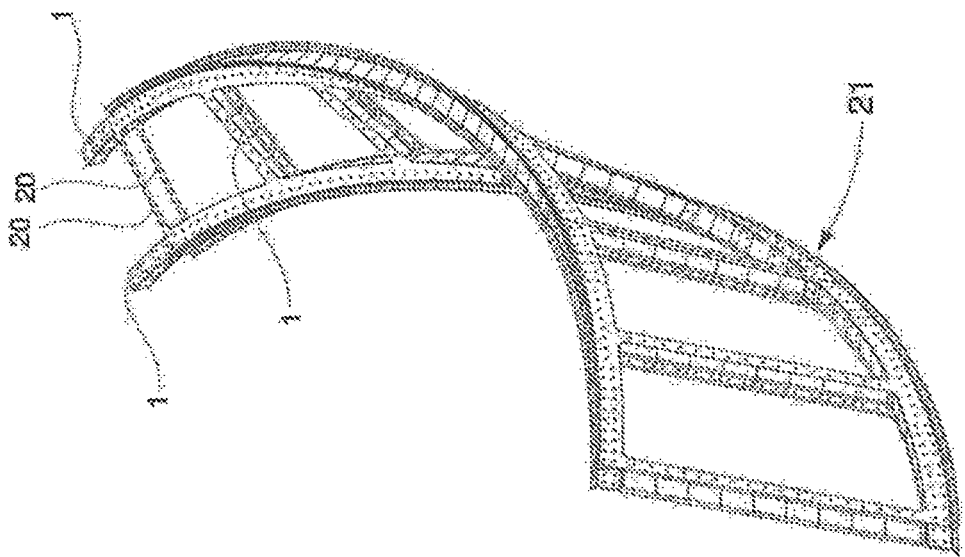

FIGS. 11a and b are a front view and a rear view of an arrangement 21 of carrier structures 1 according to the invention. In the illustrated example, the arrangement 21 has two longitudinal carriers which run parallel and which are bent and twisted and which are connected by transverse struts, and two cover surfaces 20 fixed in a mutually spaced relationship to the longitudinal carriers. The longitudinal carriers and transverse struts are produced in accordance with the method of the invention.

Figure 12:
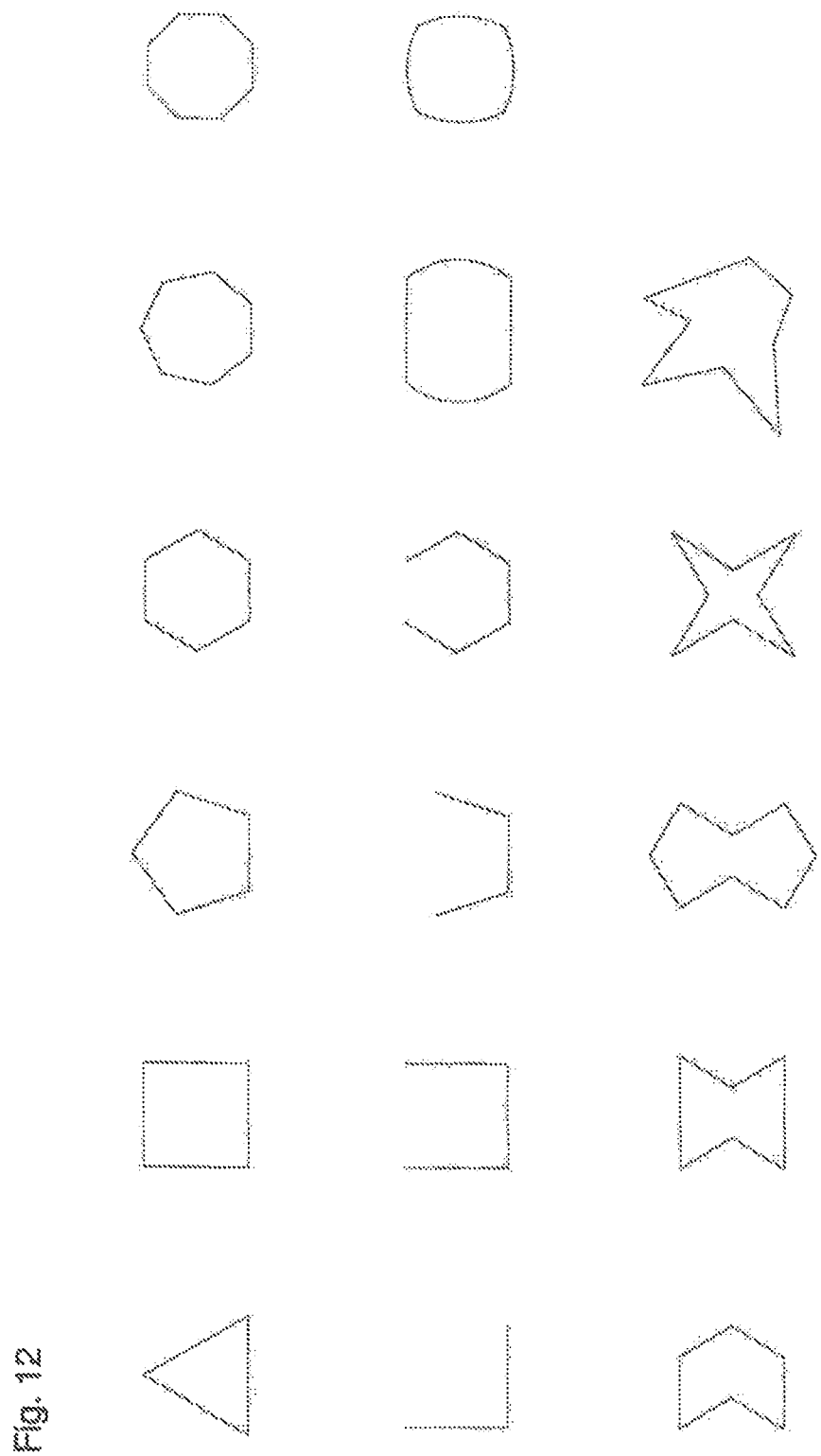
FIG. 12 shows various examples of possible polygonal cross sections.
Figure 13:
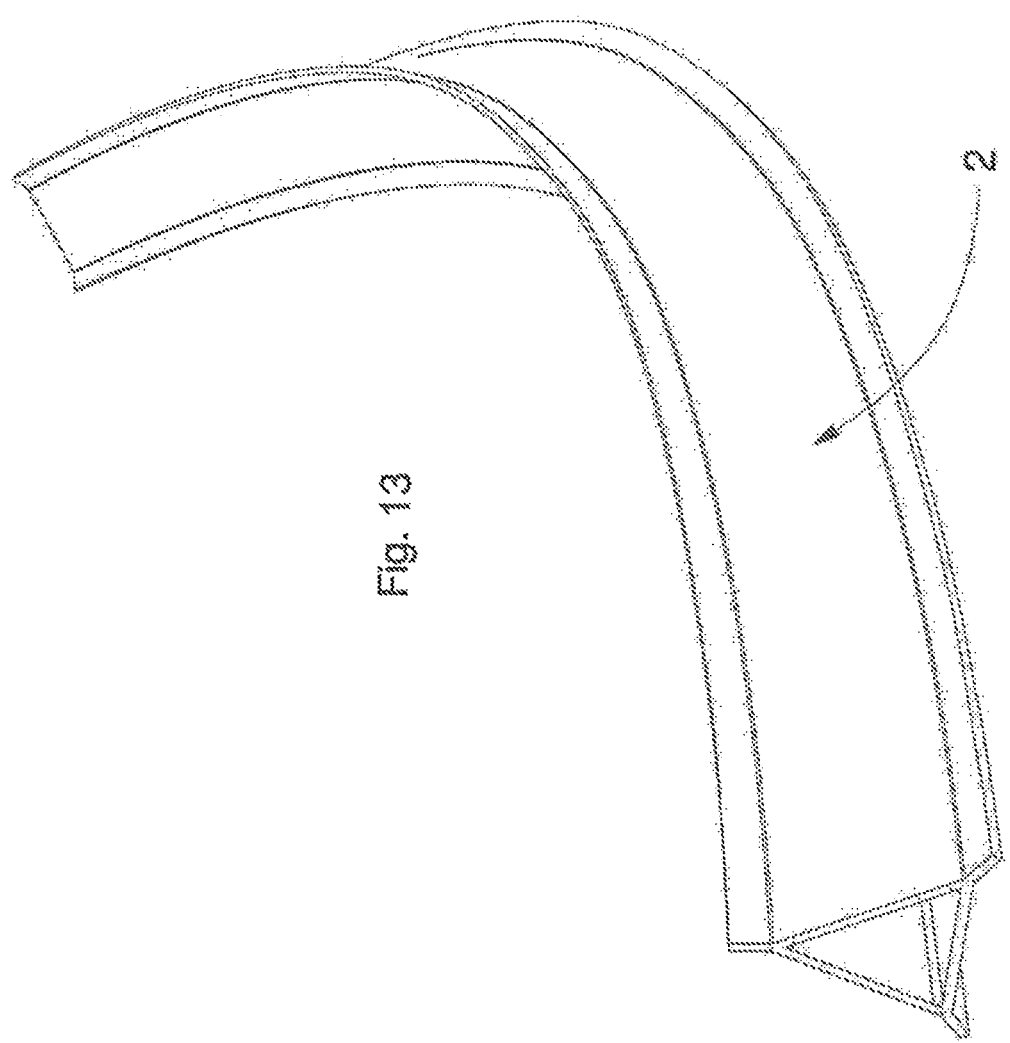
FIGS. 13 to 20 show, as alternatives to FIGS. 1 to 8, the method according to the invention with triangular polygonal cross sections instead of with quadrangular polygonal cross sections.
Figure 14:
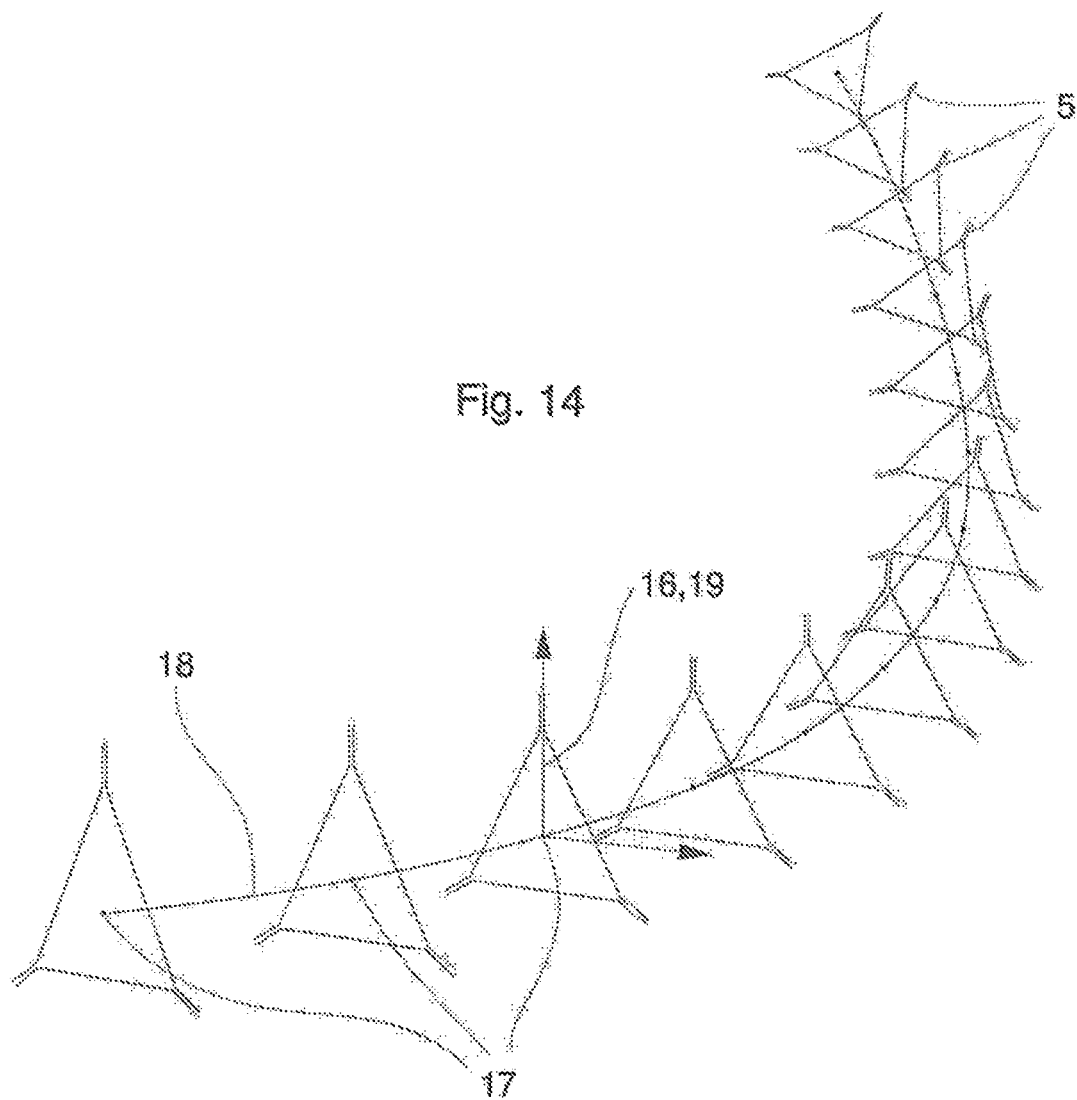
Figure 15:
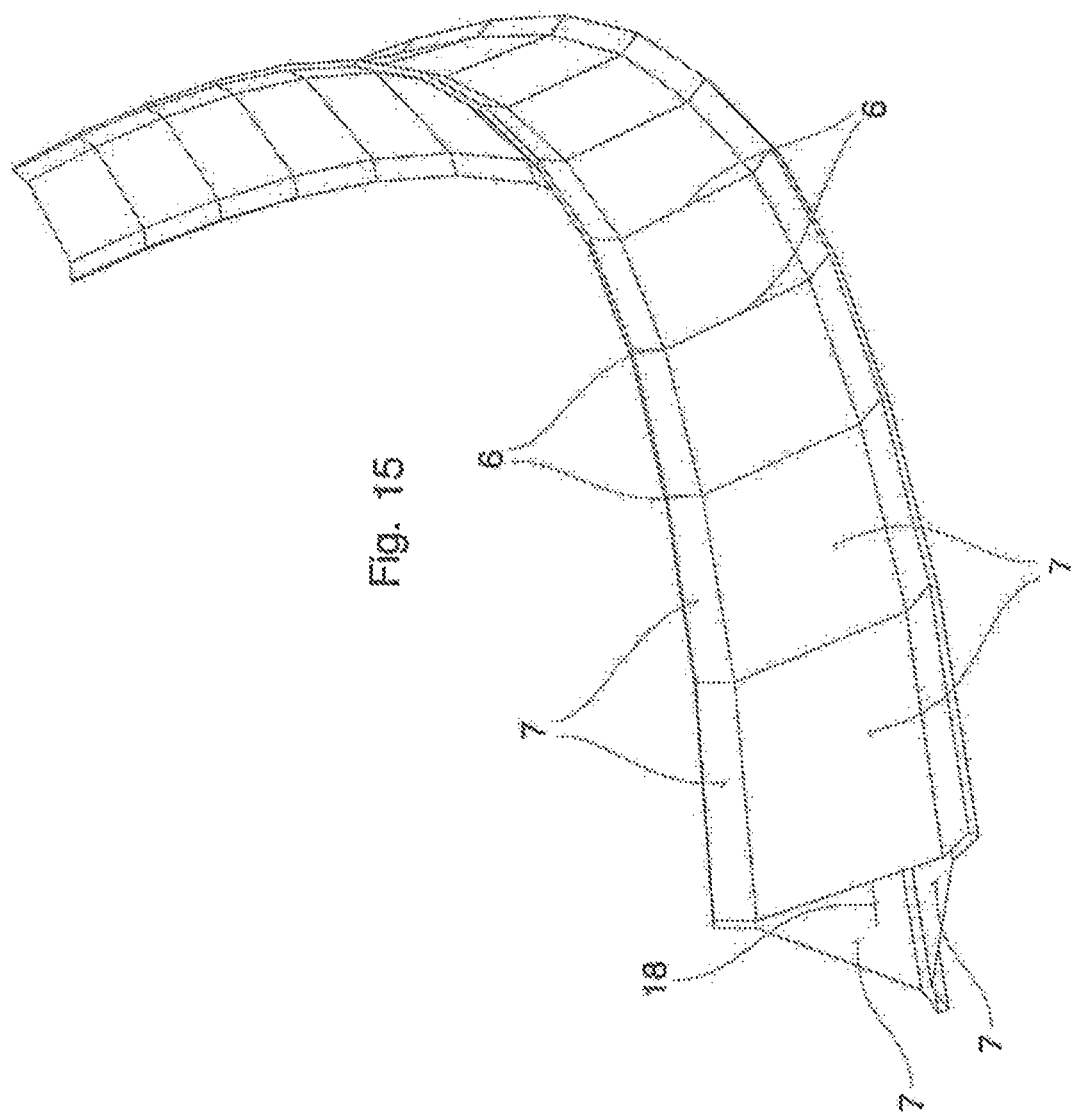
Figure 16:
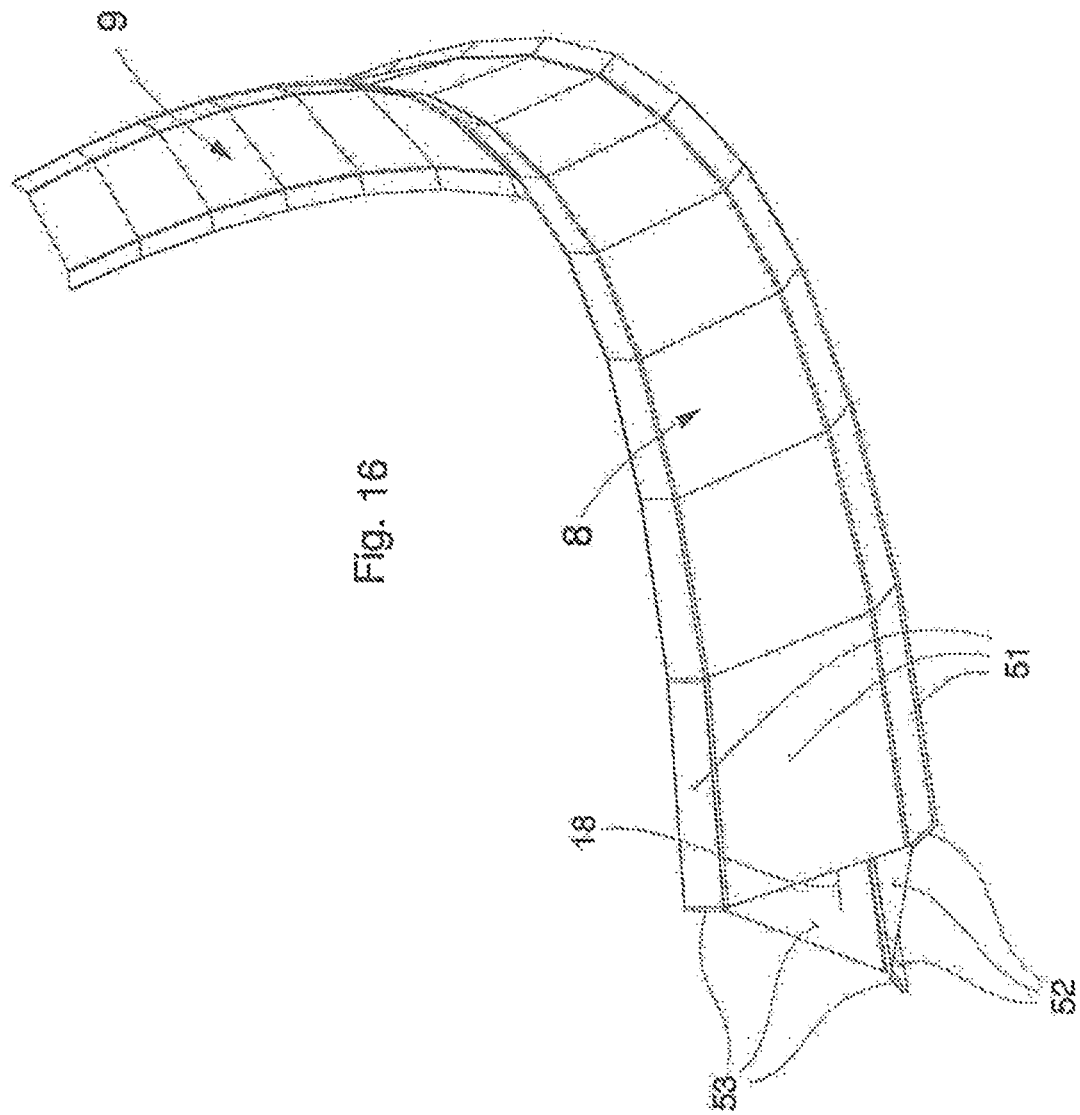
Figure 17:
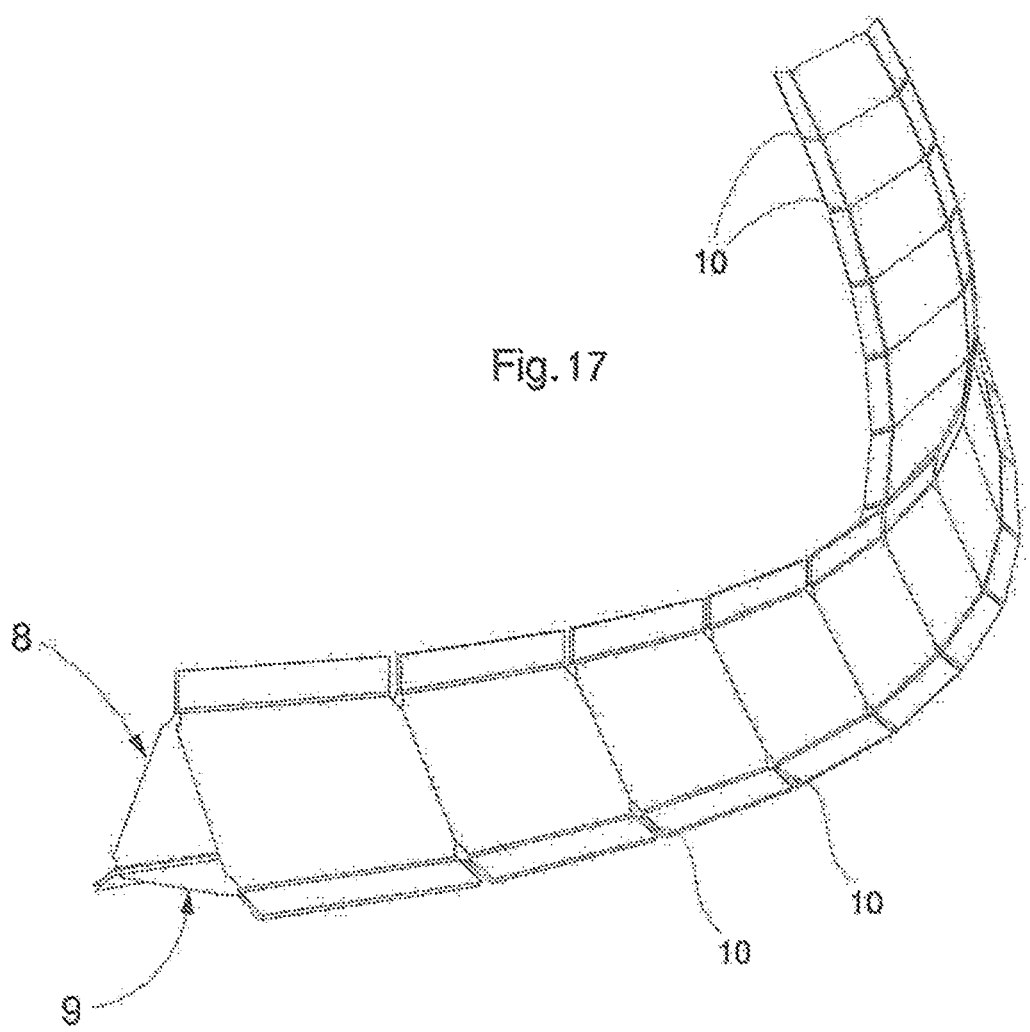
Figure 18:
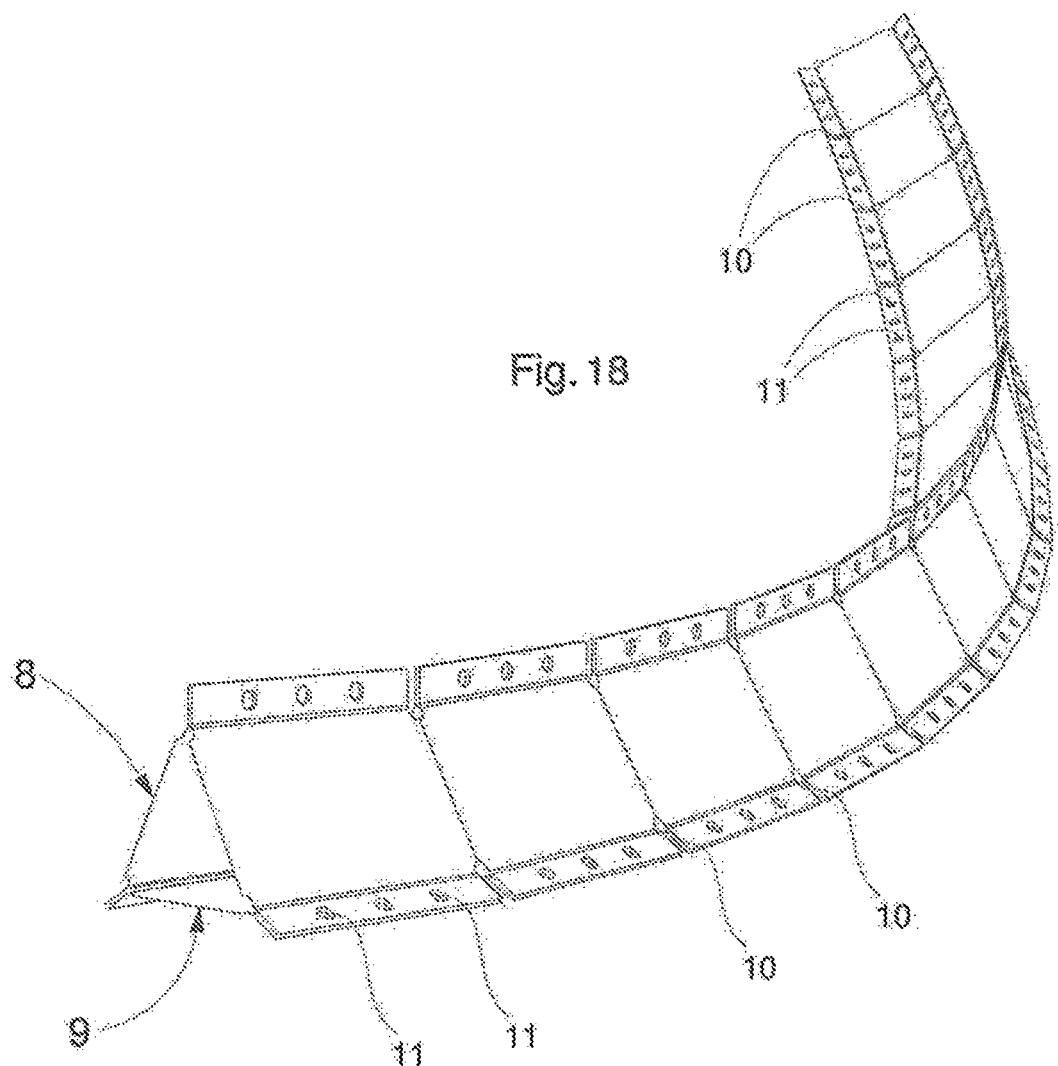
Figure 19:
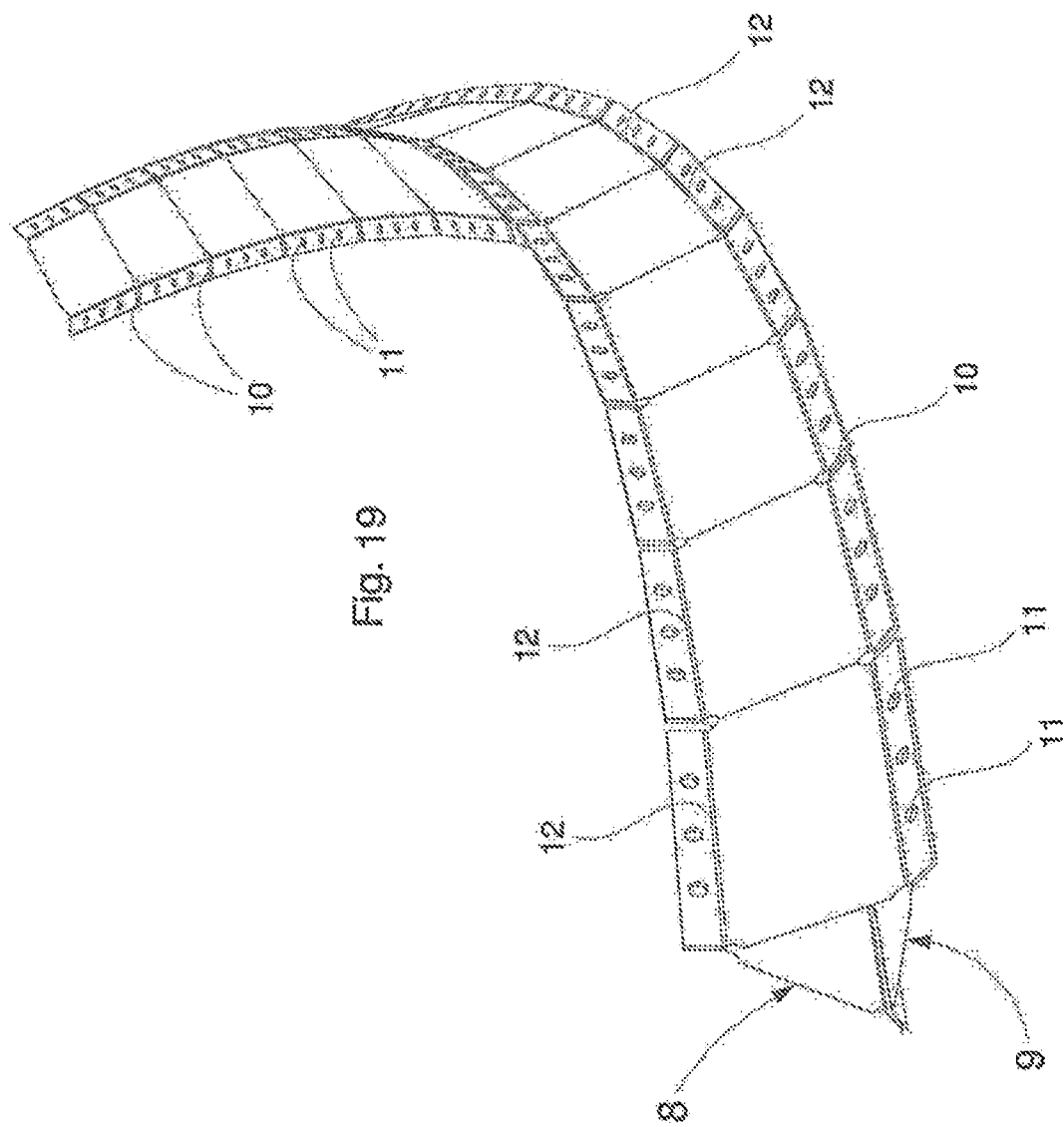
Figure 20:
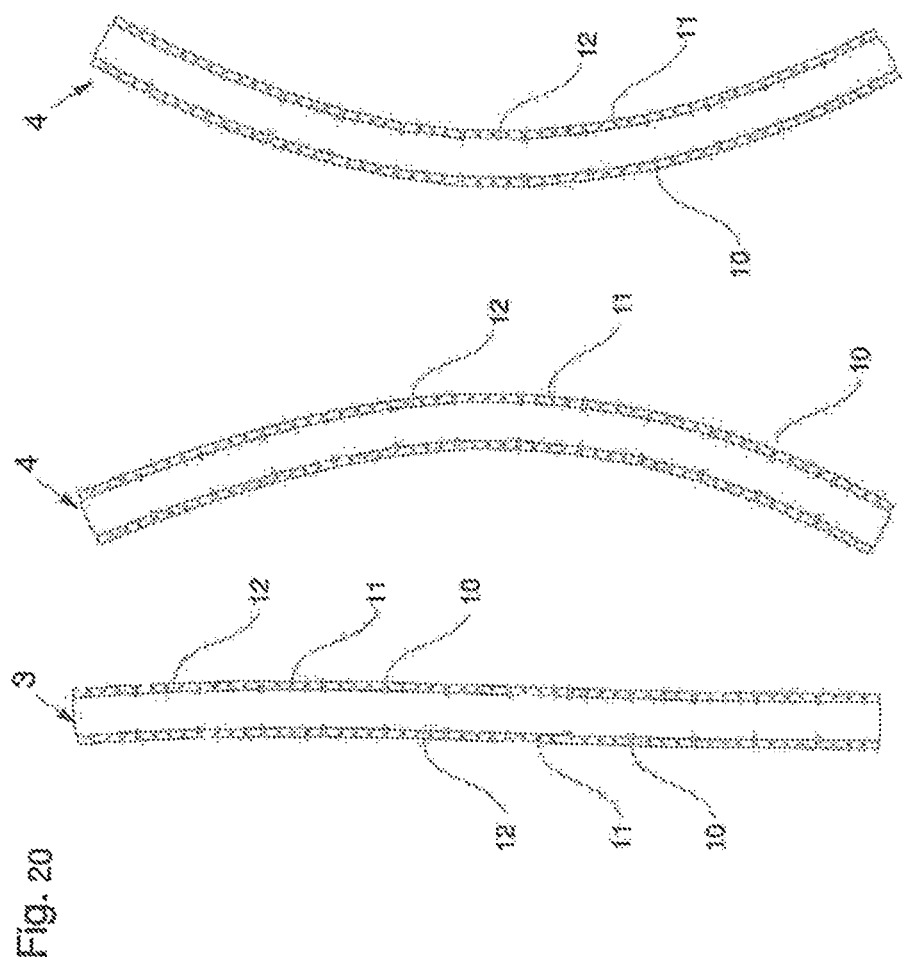

FIG. 12 shows various examples for possible polygonal cross sections 5.

As an alternative to FIGS. 1 to 8, FIGS. 13 to 20 show an example of the method according to the invention using triangular polygonal cross sections 5 instead of quadrangular polygonal cross sections 5.

Figure 21:
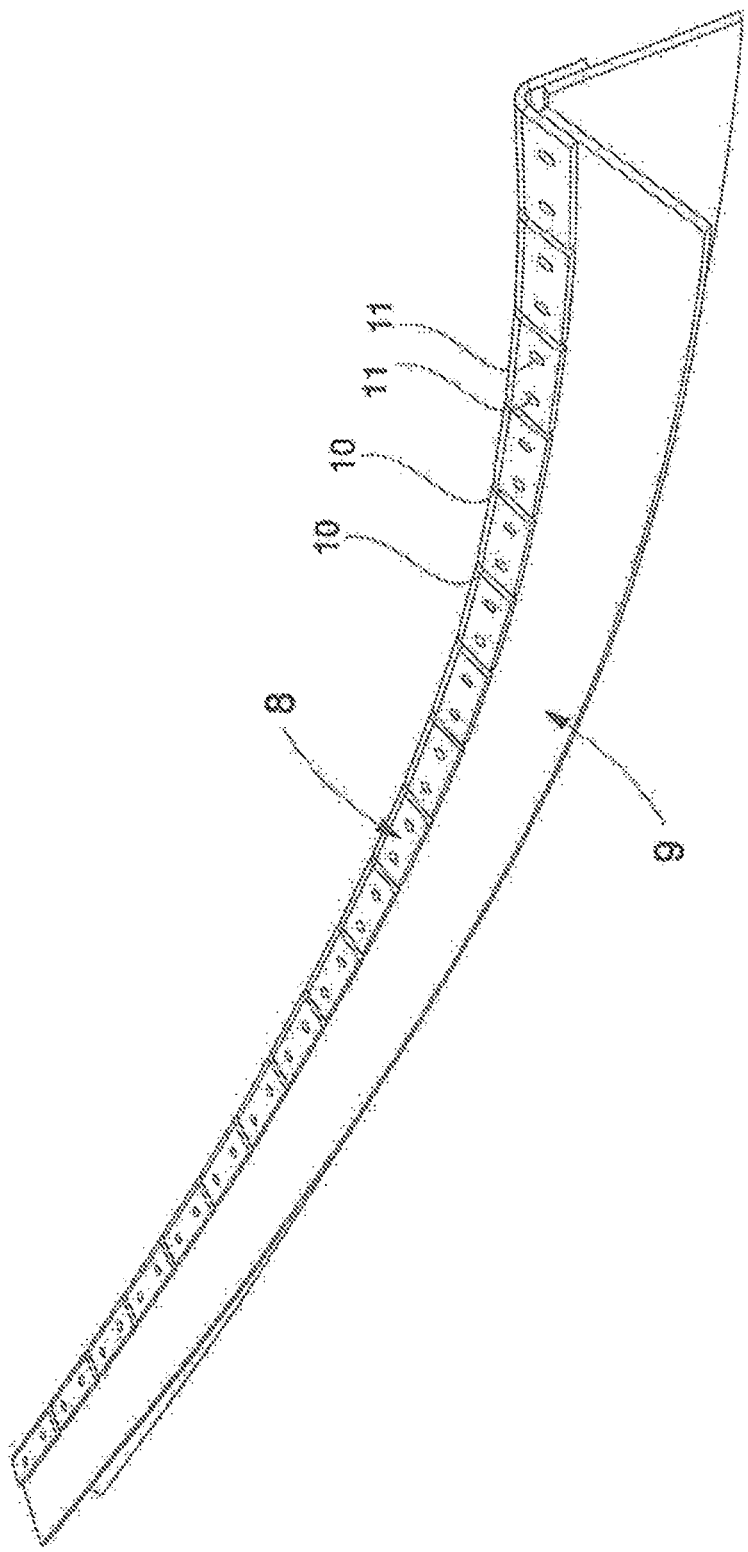
FIG. 21 shows an alternative way of connecting the triangular polygonal cross sections by means of connecting pieces.

FIG. 21, in turn, shows an alternative way of connecting the triangular polygonal cross sections 5 (by means of connecting pieces 15).

Figure 22:
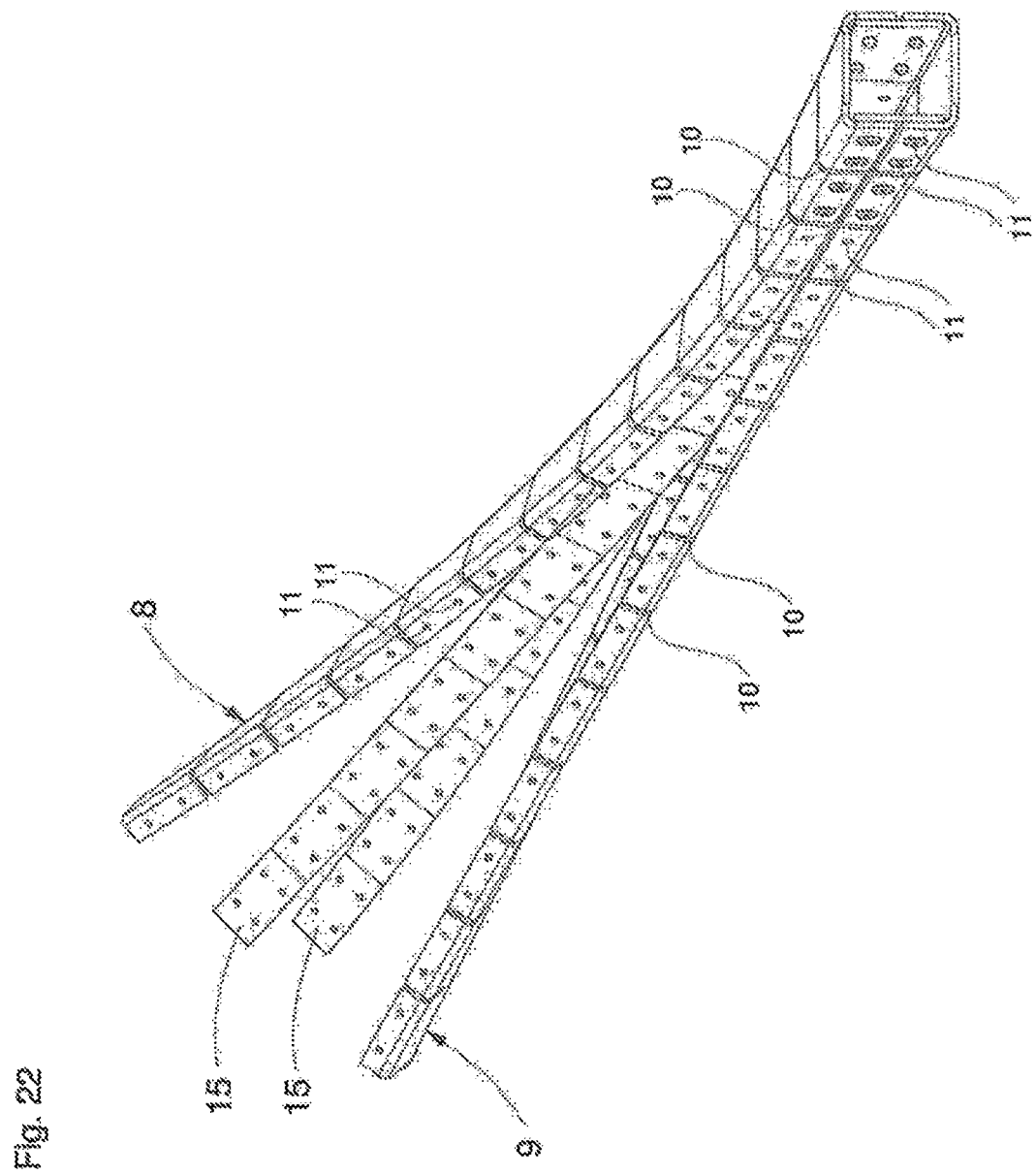
FIG. 22 shows an example of step J for the illustrative embodiment of FIGS. 1 to 9.

By way of example, FIG. 22 shows step J of the method for the illustrative embodiment of FIGS. 1 to 9. The two front segments in FIG. 22 are already connected by rivets and are therefore fixed in their twisted and curved position. The remaining segments are connected consecutively.

LIST OF REFERENCES

1 carrier structure
2 geometry
3 first flat piece of material
4 second flat piece of material 5 polygonal cross section
    51 individual surface
    52 individual surface
    53 individual surface
    54 individual surface
6 side line of a polygonal cross section
7 loft surface
8 first part of the geometry
9 second part of the geometry
10 clearance area of adjoining loft surfaces
11 junction
12 bevel edge
13 beveled first piece of material 14 beveled second piece of material 15 connecting piece
16 surface normal
17 piercing point
18 directrix
19 tangent of the directrix at the piercing point
20 cover surfaces
21 arrangement

The invention claimed is:

1. A method of producing a carrier structure which extends in a three-dimensional geometry of any desired curvature and which comprises at least one first and one second flat piece of material, wherein the geometry has curvatures in three mutually orthogonal directions, the method comprising:

A. providing a desired geometry in digital form,
B. approximating the desired geometry by determining a plurality of polygonal cross sections along an extent of the geometry and connecting the side lines of mutually successive polygonal cross-sections by loft surfaces,
C. dividing the geometry into at least one first and one second part which run along at least one part of the extent of the geometry,
D. specifying at least one clearance area of adjoining loft surfaces in the area of each polygonal cross section,
E. specifying a plurality of junctions arranged at the at least one first and one second part along the extent of the at least one first and one second part in order to later connect the at least one first and one second part,
F. specifying bevel edges extending between the polygonal cross sections,
G. unwinding the at least one first and one second part which are provided with the clearance areas and junctions and producing a cut contour in relation to the at least one first and one second part, wherein one of the curvatures located in three mutually orthogonal directions is represented in the cut contours,
H. cutting at least one first and one second flat piece of material in accordance with the cut contours in relation to the at least one first and one second part,
I. beveling the cut at least one first and one second flat pieces of material along the bevel edges resulting in at least one beveled first piece material and at least one beveled second piece of material, and
J. connecting the at least one beveled first piece of material and the at least one beveled second piece of material along the junctions, wherein a rotating and/or twisting procedure of mutually adjoining areas of the at least one beveled first piece of material and the at least one beveled second piece of material permitted by the clearance areas is effected to represent the remaining two of the curvatures present in three mutually orthogonal directions and wherein the rotated and/or twisted at least one beveled first and one beveled second piece of material are fixed by the connecting step.

2. The method according to claim 1, wherein the polygonal cross sections are formed with polygons of even-numbered order and in step D at least two clearance areas are selected at opposite side lines of the polygonal cross sections.

3. The method according to claim 1, wherein in step C the geometry is divided into the at least one first and at least one second part in the form of shells running along the extent of the geometry.

4. The method according to claim 1, wherein a connection of the at least one beveled first piece of material and the at least one beveled second piece of material is effected by the junctions by a connecting piece running at least through at least one part of the extent of the geometry.

5. The method according to claim 1, wherein, in step J, the connection procedure is made at the plurality of junctions in the form of rivet connections and/or screw connections and/or weld connections and/or adhesive connections.

6. The method according to claim 1, wherein, in step B, the polygonal cross sections are determined such that a surface normal of each polygonal cross section runs parallel to the tangent of the directrix located at a piercing point of the polygonal cross section and the directrix.

7. A computer program product including commands which, when the computer program is executed by a computer, cause the computer to carry out steps B to G of the method according to claim 1.

8. A production plant comprising a computer and a production device controlled by the computer, wherein the computer is configured to control the production device to carry out the method according to claim 1.

* * * * *